June 5, 1962  E. F. SCHMITZ  3,037,275

METHOD OF FABRICATING A MULTI-LAYER HEAD

Filed May 5, 1958  2 Sheets-Sheet 1

INVENTOR.
EWALD F. SCHMITZ

BY Andrus + Starke

Attorneys

United States Patent Office 3,037,275
Patented June 5, 1962

3,037,275
METHOD OF FABRICATING A MULTI-LAYER HEAD
Ewald F. Schmitz, Milwaukee, Wis., assignor to A. O. Smith Corporation, Milwaukee, Wis., a corporation of New York
Filed May 5, 1958, Ser. No. 733,082
1 Claim. (Cl. 29—471.1)

This invention relates to a method of fabricating a segmental multi-layer head for pressure vessels.

There has been an increasing demand in industry for vessels capable of use in high pressure and temperature operations. Generally, this demand has been met by utilizing a structure having a cylindrical shell composed of a plurality of metal layers assembled tightly one about the other, and a pair of heads which enclose the ends of the shell. By using a number of such layers, the vessel can be made strong enough for use in these operating conditions.

These multi-layer vessels require heads of a thickness such that conventional single-layer heads are relatively difficult and expensive to fabricate as special heavy forming equipment is required to contour the walls. In addition, the single-layer relatively thick wall tends to lose certain of its physical properties, such as ductility and notch toughness in use.

The present invention is directed to a multi-layer head having a plurality of segments each having a surface contour. Each segment of the vessel is fabricated from a plurality of metal plates which are provided with the desired contour in relatively small increments by forming relatively small portions of the plates in each of a series of successive forming operations. The contoured plates of a segment are then stacked, heated to forming temperature, and forced intimately together by the application of relatively high pressures to provide the plates with their final contour. The pressure is maintained while the stack of plates is cooled.

The edges of each segment are then prepared for welding and the adjacent edges of adjoining segments are subsequently welded to provide an integral head structure.

The multi-layer head of the invention is strong and efficient in operation and may be fabricated readily and economically by use of relatively light forming equipment and relatively simplified fabrication techniques.

The method of the invention prevents buckling and/or wrinkling of the plates due to circumferential compression thereof during the forming operation and thereby permits accurate alignment of opposing edges of adjacent plates. Further, waste loss, due to defectively contoured plates is thus eliminated.

The method of the invention eliminates the need for adhesives or the like between layers to prevent movement of the layers relative to one another during subsequent cutting, machining and welding operations.

The number of layers may be readily and economically varied thereby making the multi-layer head of the invention particularly adapted to be used in a wide variety of operations.

Other objects of the invention will appear in the course of the following description.

The drawing illustrates the best mode presently contemplated of carrying out the invention.

Figure 1:
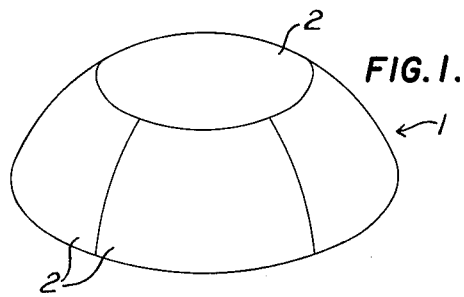
FIGURE 1 is a perspective view of the multi-layer head of the invention.
Figure 2:
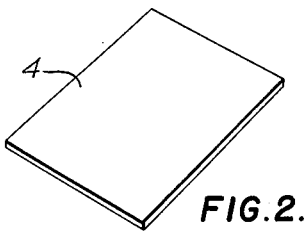
FIG. 2 is a perspective view of one of the blanks of a head segment.
Figure 3:
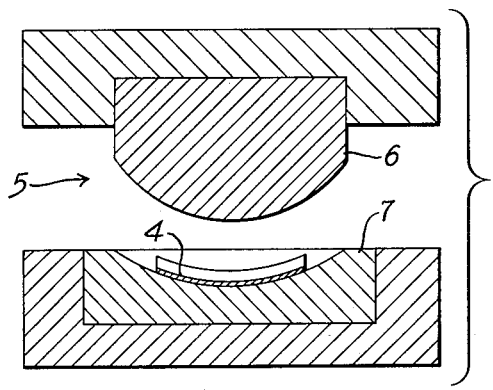
FIG. 3 is a diagrammatic view in section of the blank disposed in a die assembly after the blank has been provided with the initial contour.
Figure 4:
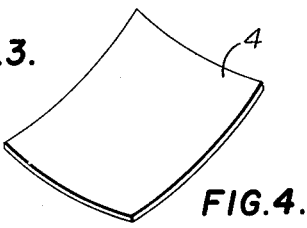
FIG. 4 is a perspective view of the contoured blank after removal from the die assembly.
Figure 5:
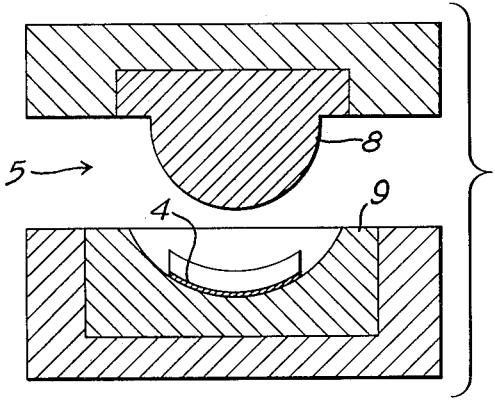
FIG. 5 is a diagrammatic view in section similar to FIG. 3 showing the contoured blank disposed in a second die assembly.
Figure 6:
FIG. 6 is a perspective view of the contoured blank after removal from the second die assembly.

Referring to the drawing and more particularly to FIGURE 1, the vessel head 1 of the invention is comprised of a plurality of segments 2 each having a surface contour. The segments are secured to one another along their adjoining edges by welding to form an integral head which is adapted to enclose the ends of a generally cylindrical pressure vessel or the like.

Each segment 2 of the head 1 is comprised of a plurality of contoured plates 3 with adjacent plates being in close intimate contact and securely bonded to one another by means to be described.

Each plate 3 of each segment 2 is formed from a generally flat metal blank 4 which is progressively contoured or formed a section at a time to obtain substantially the degree of curvature desired in the completed head 1.

The blanks 4 may be identical in size or may be varied in accordance with their disposition in the assembled segment 2 with each successive layer, relative to the inner layer, being of increasingly greater width and length to compensate for the increased span required of the plates 3 in the outer layers of segment 2.

The blanks 4 are initially heated above the mill ductility transformation temperature which generally will be within the temperature range of 100 to 120° F. At this temperature, there is a decreased tendency of the plates to crack or break upon contouring. The heated blanks 4 are then progressively formed in a series of operations to a contour substantially corresponding to that of the plates 3 in segment 2. Each successive forming operation provides the blanks with a relatively small increment of contour and is comprised of a plurality of steps in each of which relatively small portions of the blank are formed to provide the overall blank with the desired contour increment. This manner of forming enables the blanks to be contoured to the necessary extent and eliminates wrinkling or buckling in the peripheral edge of the blanks due to circumferential compression thereof.

To this end, the blanks 4 are contoured individually in a forming device 5 of the type referred to in the art as a C-press, which is provided with removable circular dies 6 and 7. A blank is moved into position between the dies either manually or by suitable mechanical means and the press is actuated to provide a section of the blank with its initial contour. With the dies open, the blank is advanced into the press to position a section of the unformed or flat blank between the dies and the dies are actuated again. Normally the contouring is accomplished by initially forming an edge portion of the blank and subsequently advancing the blank into the dies to form the inner and opposite edge portions of the blank. The other edge portions of the blank may be contoured by moving the blank laterally with respect to the dies.

Alternate forming and advancing of the blank into the press is repeated until the proper contour of the blank is obtained at which time the contoured blank is withdrawn from the dies, a second blank moved into the dies and the above process repeated. Suitable templates, not shown, are used to periodically check the smoothness and degree of contour of the blanks.

After each blank of each segment is provided with the proper contour, dies 6 and 7 are replaced by a second set of dies 8 and 9 having a slightly increased contour. The contoured blanks are then individually formed in the second set of dies in the manner set forth. This procedure is repeated until all the blanks are provided with a contour substantially equal to that of the plates 3 in the segment 2. The number of forming operations will vary according to the final contour of the plates 3 in the segment 2, the tendency of the blanks to buckle or wrinkle during contouring and/or the capacity of the forming device employed. For purposes of illustration only, the drawings show two such operations.

The forming device 5 is generally of a relatively light capacity as the blanks 4 are contoured individually and in stages so that high pressures are not required. However, more than one blank may be contoured in any one operation under certain conditions such as, for instance, where the blanks are relatively thin and/or where the capacity of the C-press is relatively high.

Figure 7:
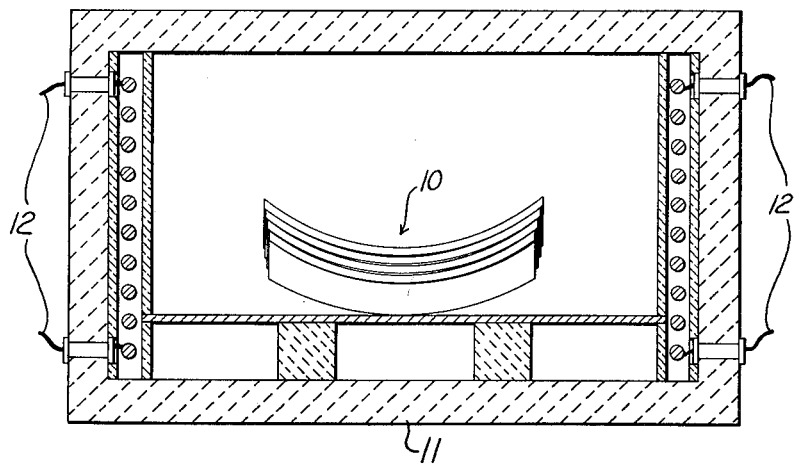
FIG. 7 is a side elevational view in section showing the contoured blanks of one of the head segments stacked together and disposed in a suitable furnace.
Figure 8:
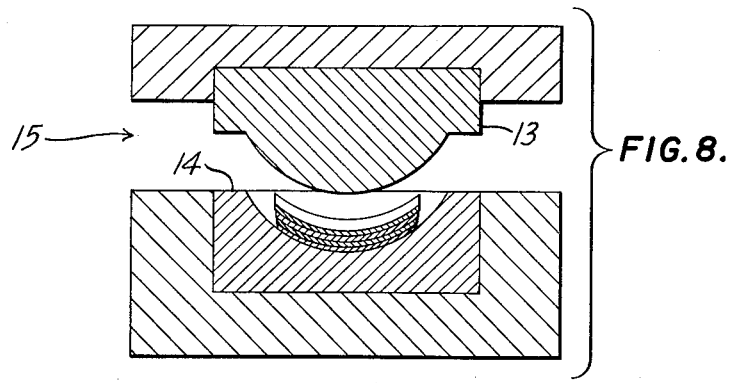
FIG. 8 is a side elevational view in section showing the stacked blanks disposed in a third die assembly.
Figure 9:
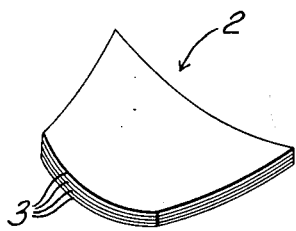
FIG. 9 is a perspective view of the stack after removal from the third die assembly and after the stack has been cut to size prior to assembly in the head.

The surfaces of the contoured plates 3 are then cleaned by sandblasting to remove oxides and other contaminants and are placed in superimposed relation to form a stack 10. As shown in FIG. 7, adjacent plates are in contact only at portions of their peripheral edges due to the same degree of curvature of each. The plates are then tack welded to one another to hold them in stacked relation to facilitate handling of the same. The stack is heated in a furnace 11 by a suitable heating means, such as induction heating element 12, to a relatively high temperature on the order of 1200° F. Pressure in the form of suitable dies 13 and 14 of a forming device 15 is then applied to the stack to force the plates together and to provide the plates with the desired contour of the completed head 2. The forming device 15 is of a higher capacity than that used to initially contour the blanks since it is desired to force the stacked plates intimately together.

The outer plates 3 will have a lesser degree of curvature in the completed head 2 than the inner plates such that as the plates are moved together by the pressure of dies 13 and 14, the degree of curvature of some or all of the plates, depending upon the initial extent of curvature, will necessarily change to allow the plates to complement adjacent plates. In any event, the change in contour is relatively slight and at the relatively high temperature of the plates, wrinkling thereof is prevented.

The curved plates are maintained within the dies while air is supplied to cool the stack to a temperature slightly below 150° F. The edges of the plates are then provided with a series of spaced string welds, not shown, while held in the dies. The stack is removed from the dies and further cooled whereupon the plates become securely bonded to one another. This bonding action may be attributed to the oxides which form on the plate surfaces at the relatively high temperatures employed in the process and which intermingle with oxides on adjacent plate surfaces under the application of the relatively high pressure of dies 13 and 14. These oxides harden to form a strong bond between adjacent layers when the plates are cooled. The string welds insure that the plates remain in intimate contact while the oxides are cooling and forming a strong bond between the plates. The need for adhesives between adjacent plates is thus eliminated.

The segment is cut to size by a torch or the like and the edges prepared for welding. The edges are subsequently welded to the opposed edges of adjacent segments to complete the head. The bond is unaffected by subsequent cutting and machining of the edges.

The method of the invention enables a multi-layer head to be fabricated by relatively simple techniques and relatively light forming equipment thereby greatly reducing the cost of the head. In addition, blanks of large area may be formed by the method of the invention on a relatively small press.

The method of the invention gradually contours the individual plates thereby enabling relatively small diameter heads to be formed with no wrinkling and/or buckling occurring in the plates. Furthermore, adjacent layers are practically inseparable enabling the layers to be effectively maintained in alingment during assembly of the head.

Various modes of carrying out the invention are contemplated as being within the scope of the following claim particularly pointing out and distinctly claiming the subject matter which is regarded as the invention.

I claim:

A method of fabricating a multi-layer head for a pressure vessel or the like comprising, individually subjecting each of a plurality of plates to a progressive series of forming operations to provide the plates with a contour substantially conforming to the final contour of the head, each of said forming operations consisting in turn of subjecting successive portions of each of the plates to an individual forming operation to provide the plates as a whole with a predetermined increment of contour from the previous forming operation, placing said plates in superimposed relation to form a stack, heating said stack, applying pressure to said stack while in a heated condition to force the plates intimately together and to provide the same with the final contour of the head, welding the edges of said plates together to form a pressure head segment while maintaining the pressure on the stack to prevent movement of said plates relative to one another, and welding the segment thus formed to the opposed edges of a segment formed in the same manner and repeating the steps of forming and welding the segments to each other until the pressure head is complete.

References Cited in the file of this patent
UNITED STATES PATENTS

| | | |
|---|---|---|
| 1,766,956 | Scull | June 24, 1930 |
| 1,925,118 | Stresau | Sept. 5, 1933 |
| 2,106,809 | Prange | Feb. 1, 1938 |
| 2,118,388 | Zerbe | May 24, 1938 |
| 2,474,149 | Hume | June 21, 1949 |